March 12, 1929.  G. EVERDING  1,705,048
PHOTOGRAPHIC PRINTING MACHINE
Filed Dec. 29, 1925   4 Sheets-Sheet 1

INVENTOR
George Everding
BY Joseph F. O'Brien
His ATTORNEY

March 12, 1929.  G. EVERDING  1,705,048
PHOTOGRAPHIC PRINTING MACHINE
Filed Dec. 29, 1925   4 Sheets-Sheet 2
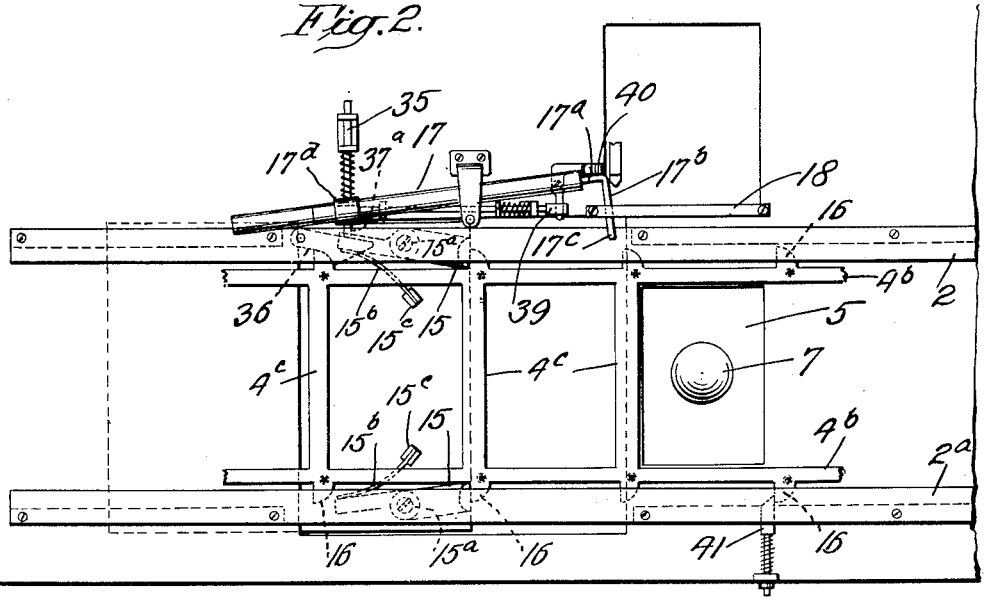
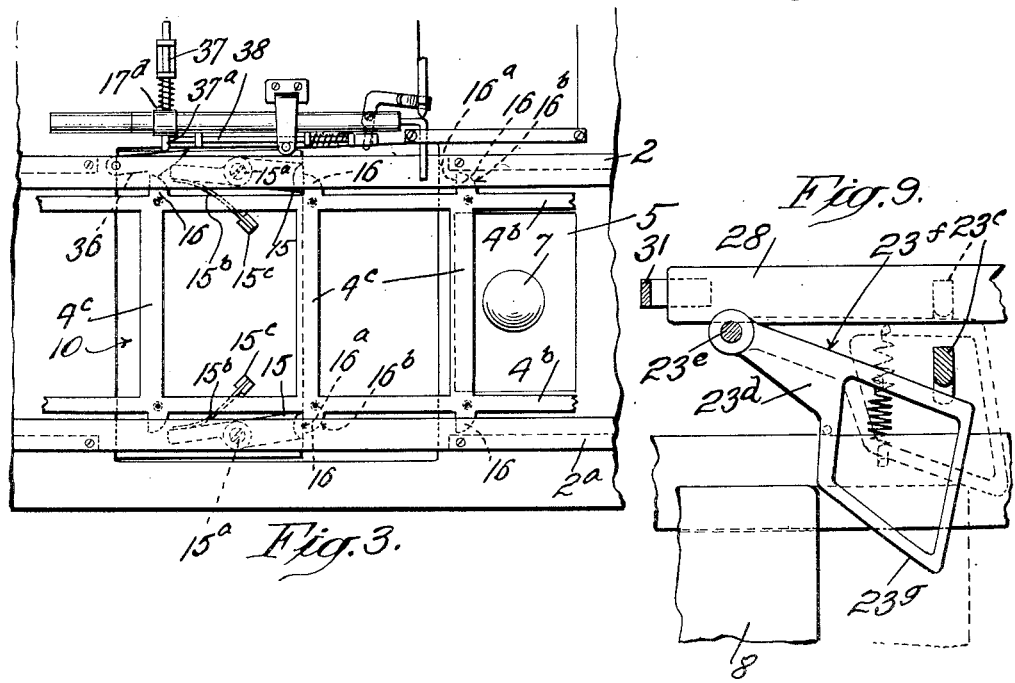

March 12, 1929. G. EVERDING 1,705,048
PHOTOGRAPHIC PRINTING MACHINE
Filed Dec. 29, 1925 4 Sheets-Sheet 3
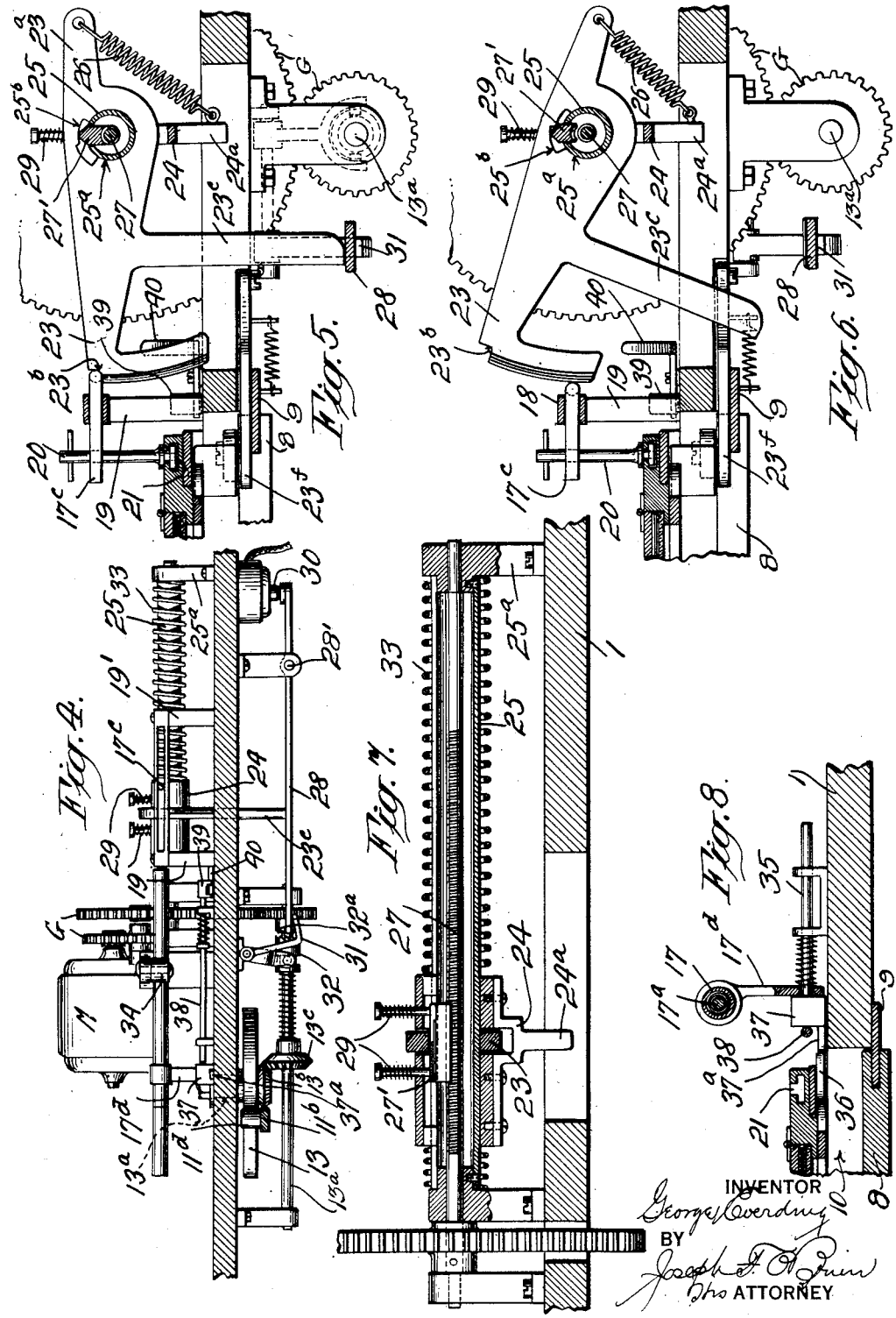
INVENTOR
George Everding
BY
Joseph F. O'Brien
his ATTORNEY

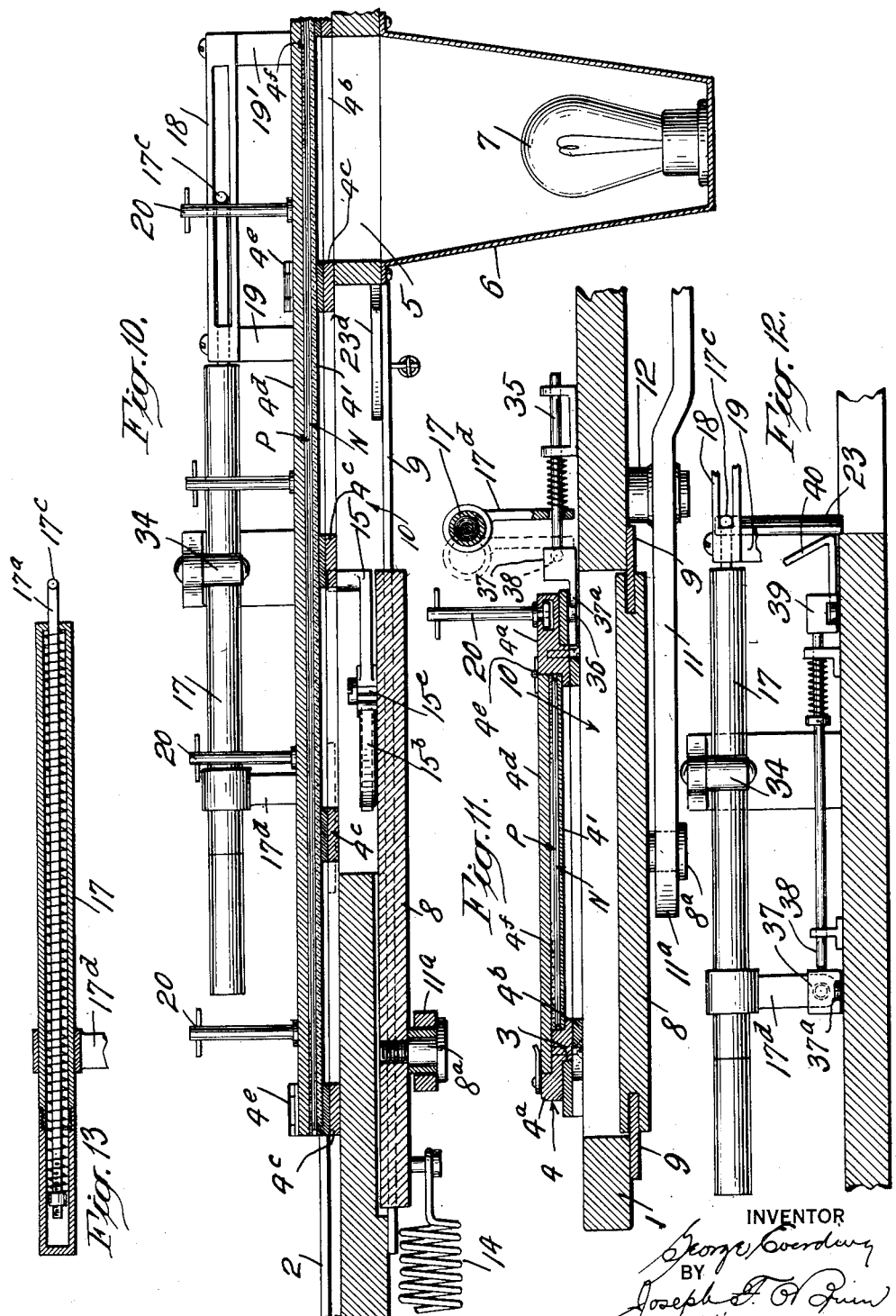

Patented Mar. 12, 1929.

1,705,048

UNITED STATES PATENT OFFICE.

GEORGE EVERDING, OF ASTORIA, NEW YORK.

PHOTOGRAPHIC-PRINTING MACHINE.

Application filed December 29, 1925. Serial No. 78,120.

This invention relates to improvements in photographic printing machines.

One of the objects of my invention is the production of a machine in which a photographic printing unit, such as a negative and sensitized paper will be mechanically carried to a light zone, exposed to light in said zone for a measured period of time and then mechanically removed therefrom.

Another object of this invention is to produce a machine which will enable a plurality of series of photographic printing units to be successively exposed to a light for an accurately measured predetermined time period; also preferably to permit each of such successive exposure periods to be independently fixed, and to enable the indication of the exposure period to be measured.

Another object is to provide in a photographic printing machine means for automatically lighting the light simultaneously with the start of movement of a time-measuring element and for automatically extinguishing the light at the completion of said movement.

Another object of the invention is the provision in a photographic printing machine of a carrier for a plurality or series of photographic units, in combination with means for causing the carrier to have a step by step movement and during each step to move a unit of the series into the light zone, to retain the same in said light zone for a predetermined, measured time-interval, to move the said unit out of said light zone and to automatically reset the mechanism for the next unit.

Another object of the invention is to provide, in a machine of the character described, a time or period measuring means by which the exposure period may be measured by the length or distance of travel of a travelling member in relation to an adjustable time-fixing member which is preferably automatically operable into set position by an operating member on the carrier during the movement of said carrier into the exposure zone.

Another object of the invention is to provide means whereby the first movement of the carrier toward the exposure zone will cause a positioning of the time-fixing member to cause the same to be engaged and adjusted for a predetermined time period by the operating member in the carrier, and a subsequent portion of the movement of the carrier and plunger will cause a positioning or setting in relation to said time-fixing member of a travelling time-measuring member.

Another object of my invention is to provide in a machine of the character described, means operable by the movement of the carrier to initially latch the time-fixing member in operator-engaging position and releasable by the movement into set position of the time-measuring member to permit the adjustable time-fixing member to be moved out of engagement with the operator and to be reset for the operator associated with the next printing unit.

Another object of the invention is to provide in a machine of the character described, reciprocating plunger mechanism to give the carrier the required step by step movement.

Another object of my invention is to provide means preferably comprising plunger mechanism and operated simultaneously with the setting of the time-measuring member for moving the carrier a step forward to cause the operator thereon to engage and move the adjustable time-fixing member to fix the time period.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 2 is a fragmentary view, in plan, showing the position of the time-fixing and measuring members after completion of the time-measuring movement and the automatic retraction thereof but before resetting of the time-fixing member for engagement with the operating member associated with the next unit;

Fig. 3 is a fragmentary view similar to Fig. 2 showing the position of the parts after the time-fixing member is moved and latched in reset position in the path of the next operating member and before resetting of the travelling time-measuring element in relation thereto and the simultaneous releasing thereof by the latching member;

Fig. 4 is a section on the line 4—4 of Fig. 1 showing the time-fixing and measuring members in operation, substantially in the position as illustrated in Fig. 1;

Fig. 5 is a section on the line 5—5 of Fig. 1 showing the time-measuring member in operative position in engagement with the time-fixing member and also in engagement with the lighting switch;

Fig. 6 is a sectional view similar to Fig. 5 showing the travelling time-measuring member disengaged from the screw and retracted into unset or disengaged starting position;

Fig. 7 is a fragmentary section on the line 7—7 of Fig. 1;

Fig. 8 is another fragmentary section on the line 8—8 of Fig. 1;

Fig. 9 is a fragmentary view showing the cam for engaging the time-measuring member to depress it and to cause simultaneous engagement thereof with the time-fixing member, the travelling screw which causes travelling motion and the lighting switch to light the lamp;

Fig. 10 is a fragmentary longitudinal section on the line 10—10 of Fig. 1;

Fig. 11 is a fragmentary cross section on the line 11—11 of Fig. 1;

Fig. 12 is a fragmentary longitudinal section on the line 12—12 of Fig. 1; and

Fig. 13 is a section through the tubular time-fixing member.

Figure 1:
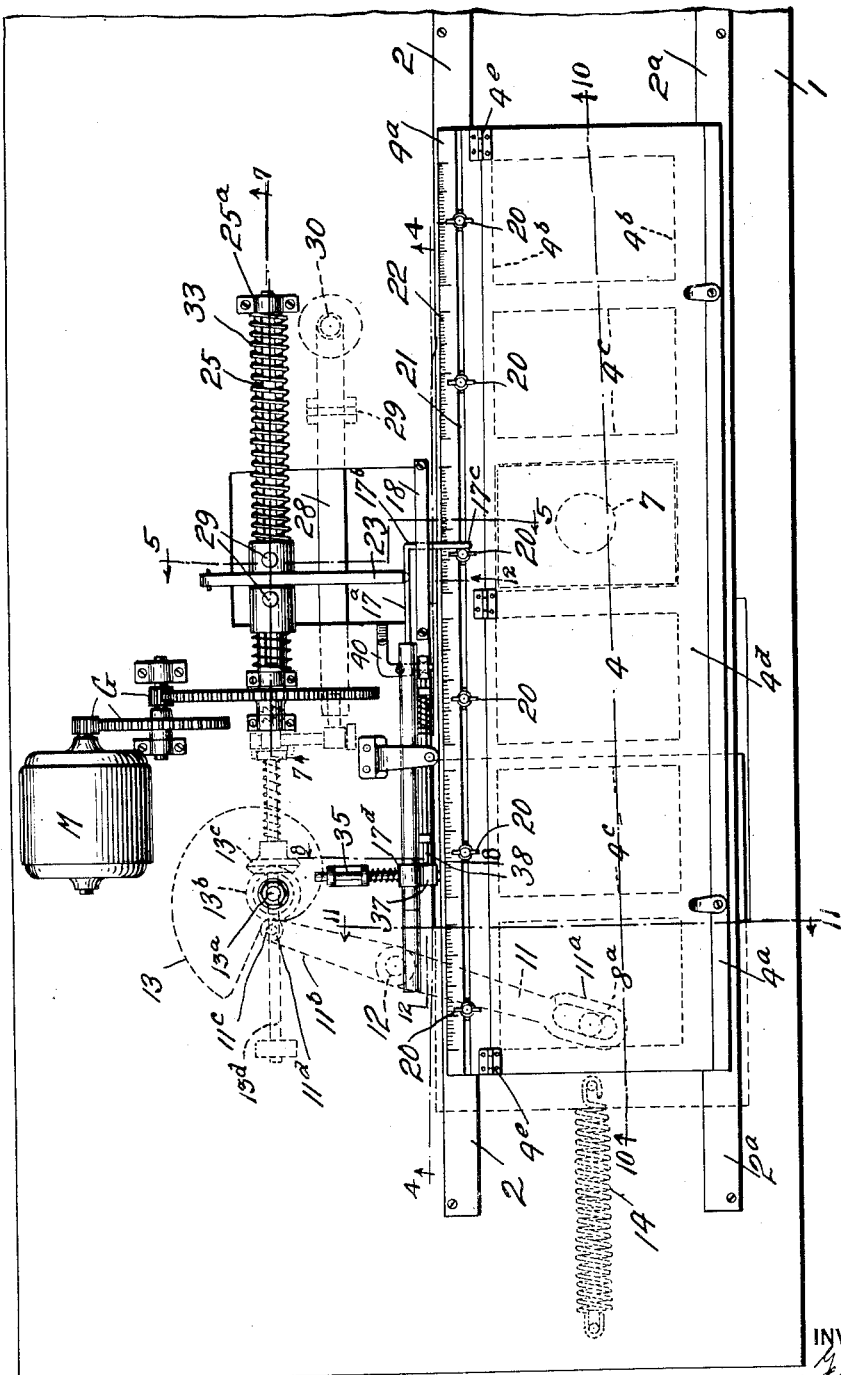
Fig. 1 is a plan view of a machine embodying my invention showing my adjustable time-fixing member in engagement with the operator on the carrier and cooperating with the travelling time-measuring member to cause an exposure of a printing unit.

Referring now to these drawings which illustrate a preferred embodiment of my invention, 1 indicates a base-board which may be supported in any suitable manner having mounted thereon a pair of tracks 2, comprising, as shown, metal strips which are preferably elevated to provide tracks which fit into side grooves 3 formed in a carrier 4 adapted to have a guided sliding movement along the said tracks. Said carrier, as shown, comprises a frame composed of a pair of longitudinal rails or frame members $4^a$ Z-shaped in cross section and having metallic bed strips $4^b$ suitably connected thereto to form the groove 3 within which tracks 2 fit. The side rails of the carrier and, as shown, the bed strips $4^b$ are preferably connected by a series of cross rails $4^c$ at suitable points along their length so as to leave spaces preferably rectangular in configuration between a pair of cross rails and said side rails respectively, each pair of cross rails thus forming with the side rails an open frame by which a photographic printing unit comprising a negative plate or a film N and a piece of sensitized paper P may be supported.

As shown, the corners of the side rails are cut away to provide ledges on which are supported a sheet of glass 4' which preferably covers all of the entire series of frame openings in the carrier and also forms a support for the photographic printing unit, a strip of sensitized print paper and a series of photographic negatives which are usually embodied in a film, but it will be obvious that my machine without substantial modification may be utilized for the handling of photographic plates as well as films.

The sensitized print paper and film are supported on the glass and a suitable mat $4^f$ is usually placed over the same. In the preferred embodiment of my invention shown, a cover plate $4^d$, is preferably hinged at one side edge on one of the rails $4^a$ as at $4^e$ and has at its opposite side edge a releasable connection with the other rail. This cover plate is adapted to close over said print paper, negatives and mat to lock the same within the frame and to retain them in flat condition therein.

An exposure opening 5 is provided in the path of the carrier and, as shown, the said exposure opening is formed in the base-board between the rails of the track and preferably conforms in outline or configuration to the frame openings of the carrier. As illustrated, a casing 6 is arranged below said exposure opening and an electric lamp 7 is mounted in said casing to provide a light exposure through the opening 5 and to permit impingement of the light against a photographic printing unit within one of the open glassed frames in the carrier when the said unit is moved by the carrier over said opening.

In the embodiment shown, a series of six of these carrier openings are shown and mechanism is employed to give the carrier a step by step movement to automatically and successively move each of such openings and the photographic unit supported above the same into registration with said exposure opening in the base-board.

In the preferred embodiment of my invention, I provide means whereby the movement by the carrier of a unit into registration with the exposure opening causes the carrier to be retained with the unit over such opening for an accurately-measured time interval and then to be moved along the other frame openings and each successively and automatically moved into registration and respectively held in registration for accurately measured time intervals.

These time intervals are preferably independently fixed so that the exposure of each unit may, if desired, be varied to suit the character of the picture or negative. For the purpose of so successively moving these unit frames into registration with the exposure opening and retaining the same therein for accurately measured time intervals, I provide means operable by a member on the carrier and preferably movable longitudinally with the carrier for determining or fixing the length of the time interval combined with a travelling member for measuring the period of time so fixed and means operated by the setting of the time-measuring member for moving the carrier to remove one printing unit from such exposure zone and to automatically move another film into such exposure zone.

My preferred means for giving the carrier a step by step movement, as aforesaid, comprises a plunger 8 mounted beneath the track on which the carrier is guided to move and, as illustrated, this plunger is mounted in ways 9 comprising strips suitably fastened to the base-board at the edge of the plunger opening 10. This plunger 8 may be reciprocated longitudinally in any suitable manner and, as shown, derives its reciprocating movement from a lever arm 11 having at its outer end 11$^a$ a slotted connection with a stud 8$^a$ on the plunger. Said lever arm 11 is, as illustrated, pivoted on a pivot 12 fixed in the bottom of the base-board and having at its opposite end 11$^b$ a roller 11$^c$ which is engaged by a cam 13 rotatably mounted on a stub shaft 13$^a$ supported in the base-board 1 and rotated by the meshing of a bevel pinion 13$^b$ on said shaft 13$^a$ with a bevel pinion 13$^c$ on the clutch-controlled shaft 13$^d$ which in the embodiment illustrated is rotated by a train of gears G connected with a motor M. Obviously upon the rotation of the cam 13 the lever will be swung about its pivot and the plunger will be operated to swing the plunger forwardly. The plunger is normally held in its rearmost position by an expansion spring 14 so that as soon as the cam completes one cycle of movement the plunger will be moved rearwardly to its starting position, and the roller will be kept in engagement with the cam surface.

The plunger 8 carries on its upper surface and contiguous to its opposite edges a pair of pivoted spring pressed dogs 15 which, as shown, are normally moved into the path of a pair of lugs 16 formed on the metal bed-strip of the carrier. These lugs 16 have a straight outwardly projecting rear face 16$^a$ against which the carrier dogs are adapted to engage and is provided with a rounded face 16$^b$ which is adapted during the forward movement of the carrier to press the spring-pressed dogs 15 inwardly out of the path thereof to permit the latching engagement behind the same. As illustrated, these dogs 15 are pivoted on screws 15$^a$ on the plunger and are normally forced into the path of the projection 16 by springs 15$^b$ mounted in the holders 15$^c$ on the top surface of the plunger.

After the movement by the carrier of a photographic printing unit into registration with the exposure opening 5, it is desirable to light the lamp and to retain the unit for a measured period of time, then to extinguish the lamp, reset the time-measuring mechanism and move a successive unit into place. I preferably set the time-measuring member to begin its movement and light the lamp simultaneously.

It is desirable that the time-interval may be varied and fixed for each printing unit and that the time-fixing member shall be adjusted by the movement of the carrier.

For this purpose I provide timing mechanism comprising an adjustable time-fixing member and a time-measuring member, the extent of motion of which is governed by the time-fixing member which in turn is operated into adjusted position by an operator on the carrier. Thus, as illustrated, the time-fixing member comprises an elongated tube 17 pivotally mounted at one side of the track and having extending through one end, a spring retractible rod 17$^a$ which is adjustable in relation to the tubing, and, as illustrated, is provided with a bend 17$^b$ terminating in an engaging projection 17$^c$ passing between elevated guide ways 18 extending parallel to the carrier track and supported at the upper end of posts 19, 19' fixed in the base-board adjacent to said track. Said engaging projection 17$^c$ extends into the path of operating posts 20 on the carrier which, as shown, is mounted in a groove 21 at one side of the carrier which is preferably provided with suitable indications 22 such as a graduated scale and is slidable along said groove so as to allow for variation of the time period in accordance with the character of the negative or other factors in relation to the printing unit. These operating posts during the movement into registration with the exposure opening 5 will cause an elongation of the time-fixing member 17 in accordance with the position thereof on the unit frame which, of course, may be easily determined by the use of the scale.

The adjustable time-fixing element 17 in the embodiment shown governs the extent of travelling movement of a time-measuring mechanism which cooperates therewith and thus accurately determines the time-interval for any particular unit. As illustrated, the travelling time-measuring mechanism comprises a measuring arm 23 mounted pivotally in a carriage 24 movable longitudinally along a slotted tube 25 and normally held in elevated position by a spiral spring 26 stretched between a rearward extension 23$^a$ of said arm and a downward projection 24$^a$ on the said carriage. Axially mounted within the said slotted tube is a screw 27 arranged to have rotary movement only and, as shown, to be rotated by the motor M through the gears G, and said carriage is provided with a sectional nut 27' normally held in elevated position by springs 29 and adapted to be depressed into engagement with the screw 27 upon the pivotal movement of the time-measuring arm 23. This pivotal, depressing movement is accomplished by a cam plate 23$^d$ pivoted at 23$^e$ and having a surface 23$^f$ engaging the depending arm 23ᶜ and also having another surface 23ᵍ engageable by the plunger at the latter end of its forward movement so as to depress said measuring arm 23 subsequent to the adjustment by the operating posts on the carrier of the time-fixing member.

As illustrated, the upper surface of the nut 27' is engaged during pivotal depressing movement of the member 23 by a bearing portion thereof, said arm being provided with a sectional pivotal bearing 25ᵃ. Said sectional nut is thus depressed into engagement with the screw so that a rotation of the screw 27 will cause a travelling movement of the carriage 24 and arm 23. Obviously the screw may be caused to rotate at a predetermined speed and the movement of the arm along the same a predetermined distance will accurately measure a time interval and will permit variations of the time-interval in accordance with the length of travelling movement.

The depression of the measuring arm causes a notch 23ᵇ to engage the adjustable extension 17ᵃ of the time-fixing member which has previously, as aforesaid, been moved into adjusted position by the operator post 20 on the carrier and is held in such adjustable position thereby. Said measuring arm 23 simultaneously with the depression into engagement with the adjustable time-fixing member 17ᵃ depresses by means of a depending extension 23ᶜ a switch lever 28 pivoted at 28' to cause the opposite ends to engage an electric switch button 30 which lights the lamp in the casing and also simultaneously operates the pivoted bell-crank lever 31 which in turn swings the clutch part 32 into engagement with the clutch part 32ᵃ to cause operation of the plunger and screw-rotating mechanism. The first operation of this mechanism is to move the plunger in one of its step by step movements and simultaneously to cause the said arm 23 to start its travelling movement by rotation of the screw 27 as hereinabove described. When the measuring arm 23 is depressed so that its notch engages the adjustable extension 17ᵃ it will be held in depressed position in engagement with the screw and will thus be caused to travel along such extension to the end thereof, which end is, as aforesaid, adjusted by the operator on the carrier. When said arm reaches the end of the time-fixing extension 17ᵃ it will ride off the same and will thereupon immediately be elevated by the spring 26 so as to release the nut from engagement with the screw whereupon a spring 33 disposed between the end of the carrier 24 and the mounting 25ᵃ of the tube 25 will operate to immediately move the said arm 23 in its elevated position to its starting point. This movement will release the time-fixing member 17 which will then be moved pivotally about a pivot 34 to swing the projection 17ᶜ out of engaging position with the operator-post 20 by means of a spring pressed plunger pin 35 mounted at the rear of the pivot 34 thereof, and cam 13 will cause the plunger to be operated to bring another unit into the exposure zone.

During the first movement of the carrier-operating plunger 8 a dog 36 will be engaged by the curved edge 16ᶜ of the projection 16 to press upon a block 37 having a toe 37ᵃ which is arranged at the end of the plunger pin by the spring pressed plunger-pin 35 which engages a depending arm 17ᵈ through which said plunger pin passes and forces said time-fixing member 17 into operative position. So soon as it reaches this operative position, a longitudinally-disposed spring-pressed rod 38 automatically slides in front of said block and latches the same in operative position. This same longitudinally-extending latching-rod is provided at its opposite ends with a notched block 39 which engages a pivoted bell crank lever 40 operable by the time-measuring arm 23 upon its depression to withdraw the rod 38 and unlatch or release said time-fixing element so that the toe 37ᵃ and the block 37 of the plunger pin 35 will again be moved outwardly into the path of the carrier projections 16 and in blocking relationship to the latching rod 38 while the said time-fixing member is retained in its operative position by the travelling time-measuring member, thus producing a complete cycle of movement which enables the automatic exposure of units for adjusted predetermined periods.

It is desirable when the carrier is moved by the plunger to lock the same against backward movement with the plunger and for this purpose I preferably provide at the side of the base-board a spring-pressed latch 41 which is adapted upon movement of the carrier to lock behind one of the projections and to prevent any backward movement thereof.

I claim:

1. In a photographic printing machine, the combination with a suitable support having a light zone, of a carrier provided with a plurality of unit frames movable through said light zone and adapted to have printing units mounted therein, means for moving said carrier intermittently, time-measuring means interposed between said carrier-moving means and the carrier and arranged upon operation to control the stationary light-exposure period thereof, and an operating-member adjustably mounted on and movable with the carrier for actuating said time-measuring means to control said stationary light exposure period.

2. In a photographic machine, the combination with a suitable support having a light zone, of a carrier provided with a plurality of unit frames movable through said light zone and adapted to have printing units mounted therein, means for moving said carrier intermittently, time-measuring means interposed between said carrier-moving means and the carrier and arranged upon operation to control the stationary light-exposure period thereof, an operating-member adjustably mounted on and movable with the carrier for actuating said time-measuring means to control said stationary light exposure period, and indicating means cooperating with said adjustable operating-member to indicate the extent of the stationary light-exposure period.

3. In a photographic printing machine, the combination with a suitable support having a light zone, of a carrier provided with a plurality of unit frames movable through said light zone and adapted to have printing units mounted therein, means for moving said carrier intermittently, time-measuring means embodying a travelling member interposed between said carrier-moving means and the carrier and arranged upon operative movement of said travelling member to control the stationary light-exposure period thereof, an operating-member adjustably mounted on and movable with the carrier for actuating said travelling member of said time-measuring means to control said stationary light-exposure period, and indicating means cooperating with said adjustable operating-member to indicate the extent of the stationary light-exposure period.

4. In a photographic printing machine the combination with a suitable frame provided with suitable isolated light exposure means of a carrier movable on said frame through said isolated light zone, mechanism for causing said carrier to have a step by step movement and during each step to move one of the printing units of a series into the said light zone, mechanism for causing the said unit to be held in exposure to light in said zone for a predetermined, measured, time interval, means for moving said unit out of said light zone upon the completion of said time interval and for automatically resetting the time measuring mechanism for the next unit, said time-measuring mechanism comprising a travelling member movable in relation to a time-fixing member.

5. In a photographic printing machine the combination with a suitable frame provided with suitable isolated light exposure means of a carrier movable on said frame through said isolated light zone, mechanism for causing said carrier to have a step by step movement and during each step to move one of the printing units of a series into the said light zone, means for causing the said unit to be held in exposure to light in said zone for a predetermined, measured, time-interval, means for moving said unit out of said light zone upon the completion of said time-interval and for automatically resetting the time-measuring mechanism for the next unit, said time-measuring means comprising a travelling member and an adjustable time-fixing member, and means associated with each unit for operating the time-fixing member during the movement of the carrier into the exposure zone.

6. In a photographic printing machine the combination with a suitable frame provided with suitable isolated light-exposure means of a carrier movable on said frame through said isolated light zone, mechanism for causing said carrier to have a step by step movement and during each step to move one of the printing units of a series into the said light zone, mechanism for causing the said unit to be exposed in said light zone for a predetermined, measured, time interval, means for moving said unit out of said light zone upon the completion of said time interval and for automatically resetting the mechanism for the next unit, said time-measuring means comprising a travelling member and an adjustable time-fixing member, means on the carrier adapted during the movement thereof toward the exposure zone to engage said time-fixing member and to adjust the same for a predetermined time period, and means, operable by the carrier-operating mechanism for causing a positioning or setting in relation to said time-fixing member of the said travelling time-measuring member.

7. In a photographic printing machine, the combination with a suitable frame having an isolated light zone and a carrier movable through said zone, mechanism for causing said carrier to have a step by step movement through said zone, a time-measuring mechanism comprising a travelling time-measuring member, and an adjustable time-fixing member, latching means operable to initially latch the time-fixing member in position to be engaged by the operator on the carrier, said latching means being releasable by the movement into set position of the time-measuring member to permit the time-fixing member to be moved out of the path of one operator and to be reset for engagement by the operator associated with a next subsequent printing unit.

8. In a photographic printing machine, the combination with a suitable frame having an isolated light zone of a carrier movable on said track through said zone, a plunger mechanism capable of reciprocating movement and provided with means to engage said carrier in one leg of said reciprocating movement only and to cause said carrier to have a step by step movement in said direction, time-measuring mechanism mounted adjacent to said carrier and comprising a time-measuring travelling-member and an adjustable time-fixing member, means for adjusting the time-fixing member, means for causing reciprocation of said plunger mechanism, means actuated by the plunger for starting the travelling movement of said time-measuring member substantially simultaneously with the movement of a unit into the light zone.

9. In a photographic printing machine, the combination with a suitable frame having an isolated light zone of a carrier movable on said track through said zone, a plunger mechanism capable of reciprocating movement and operable to engage said carrier in one leg of said reciprocating movement only and to cause said carrier to have a step by step movement in said direction, time-measuring means mounted adjacent to said carrier and comprising a time-measuring travelling member and an adjustable time-fixing member, means for causing the operation of said plunger mechanism, means set in operation by the plunger for moving said time-measuring member substantially simultaneously with the movement of a unit into the light zone, a lamp in said isolated light zone and means operable to light said lamp simultaneously with the start of the time-measuring movement of said travelling time-measuring member.

In witness whereof, I have signed my name to the foregoing specification.

GEORGE EVERDING.